United States Patent
Juhas

(10) Patent No.: US 11,377,170 B2
(45) Date of Patent: Jul. 5, 2022

(54) ACTIVE DERAILLEUR SYSTEM AND METHOD

(71) Applicant: GM GLOBAL TECHNOLOGY OPERATIONS LLC, Detroit, MI (US)

(72) Inventor: Martin Juhas, Ottawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 318 days.

(21) Appl. No.: 16/597,422

(22) Filed: Oct. 9, 2019

(65) Prior Publication Data

US 2021/0107594 A1    Apr. 15, 2021

(51) Int. Cl.
*B62M 9/126*     (2010.01)
*B62M 9/1246*    (2010.01)
*B62M 9/122*     (2010.01)

(52) U.S. Cl.
CPC ............ *B62M 9/126* (2013.01); *B62M 9/122* (2013.01); *B62M 9/1246* (2013.01)

(58) Field of Classification Search
CPC ...... B62M 9/121; B62M 9/122; B62M 9/126; B62M 9/1244; B62M 9/1246
USPC ........................................................ 474/80
See application file for complete search history.

(56) References Cited

U.S. PATENT DOCUMENTS

| | | | |
|---|---|---|---|
| 10,155,568 B2 | 12/2018 | Hayslett et al. | |
| 10,227,106 B2* | 3/2019 | Tsuchizawa | B60L 15/2009 |
| 2004/0206188 A1* | 10/2004 | Takamoto | B62M 25/08 |
| | | | 73/781 |
| 2008/0227572 A1* | 9/2008 | Sakaue | B62M 9/122 |
| | | | 474/82 |
| 2009/0191994 A1* | 7/2009 | Takamoto | B62M 25/08 |
| | | | 474/70 |
| 2009/0291789 A1 | 11/2009 | Ishikawa | |
| 2013/0303317 A1* | 11/2013 | Yamaguchi | B62M 9/126 |
| | | | 474/80 |
| 2014/0213397 A1* | 7/2014 | Yamaguchi | B62K 23/04 |
| | | | 474/80 |
| 2017/0174289 A1* | 6/2017 | Wu | B62M 9/16 |
| 2019/0249769 A1* | 8/2019 | Hamed | B62M 9/132 |

FOREIGN PATENT DOCUMENTS

| | | |
|---|---|---|
| CN | 208630792 U | 3/2009 |
| CN | 101590897 A | 12/2009 |
| CN | 204916029 U | 12/2015 |

\* cited by examiner

*Primary Examiner* — Gene O Crawford
*Assistant Examiner* — Emily Rose Kincaid
(74) *Attorney, Agent, or Firm* — Lorenz & Kopf LLP

(57) ABSTRACT

Systems and methods are provided for actively controlling a derailleur. A derailleur system includes a cassette including a number of sprockets, a drive unit that drives the cassette, and a chain linking the drive unit with the cassette. A derailleur is configured to guide the chain around the cassette, the derailleur including a swing arm rotatable at a pivot assembly to maintain tension on the chain. A lock selectively locks the swing arm from rotating.

20 Claims, 10 Drawing Sheets

ACTIVE DERAILLEUR SYSTEM AND METHOD

INTRODUCTION

The present disclosure generally relates to systems and methods for operating a drive system that includes a derailleur, and more particularly relates to active control of derailleurs for shifting, tension control and back driving.

Cycles provide an economical method of transportation and are in widespread use. They are propelled through manual pedaling, motorized power, or a combination of the two. Cycles are constructed in a variety of wheel configurations. Typically, the gear ratios at the rear wheel or wheels of a cycle are changed through operation of a gear shifting mechanism. One such mechanism is a derailleur that guides a drive chain between different sized sprockets at the rear wheel(s) to change gearing ratios. To change gears, the derailleur is generally moved in a direction parallel to the axle of the rear wheel in response to control inputs. In addition, a part of the derailleur typically freely pivots with pre-tension in the direction of the chain's routing to maintain chain tension and enable movements between the different sized sprockets.

The limited level of control available for derailleurs restricts the ability to provide additional functions. For example, derailleur responsiveness is generally limited to moving the chain between sprockets. Conventional derailleurs are incompatible with regenerative braking and back-driving. In addition, the free pivoting nature of typical derailleurs may allow the chain to undesirably slack when the cycle is operated over rough roads or uneven surfaces.

Accordingly, it is desirable to provide systems and methods for active control of a derailleur to maintain chain tension and to provide a broader range of functions. Furthermore, other desirable features and characteristics of the present invention will become apparent from the subsequent detailed description and the appended claims, taken in conjunction with the accompanying drawings and the foregoing technical field and introduction.

SUMMARY

Systems and methods are provided for actively controlling a derailleur. In various embodiments, a derailleur system includes a cassette including a number of sprockets, a drive unit that drives the cassette, and a chain linking the drive unit with the cassette. A derailleur is configured to guide the chain onto the sprockets assembled in the cassette. The derailleur includes a swing arm rotatable at a pivot assembly to maintain tension on the chain. A lock selectively locks the swing arm from rotating.

In additional embodiments, the cassette is configured to drive the drive unit through the chain when the lock is in a locked position.

In additional embodiments, the cycle includes a frame and the derailleur is coupled with the frame. The pivot assembly includes a nonrotatable body fixed to the frame, and a rotatable body fixed to the swing arm. The lock includes a lock effector disposed between the nonrotatable body and the rotatable body.

In additional embodiments, the lock effector comprises a clutch.

In additional embodiments, the lock effector comprises first teeth on the nonrotatable body that are selectively engageable with second teeth on the rotatable body.

In additional embodiments, a controller is configured to: determine whether shift conditions are met, where the shift conditions include requirements for initiating a shift between the number of sprockets; unlock the lock when the shift conditions are met; and lock the lock when the shift is complete.

In additional embodiments, a controller is configured to: unlock the lock to effect a shift between the number of sprockets; lock the lock when the shift is complete; and process a pedal torque model to match timing of the shift to a shift window where torque on the chain is below a threshold.

In additional embodiments, a controller is configured to: unlock the lock to effect a shift between the number of sprockets; lock the lock when the shift is complete; and process a model to match timing of the shift to an ideal shift point where the chain is positioned at a select point relative to the cassette.

In additional embodiments, the cycle includes a frame and the derailleur is coupled with the frame. The pivot assembly includes a nonrotatable body fixed to the frame, and a rotatable body fixed to the swing arm. The lock includes a lock effector disposed between the nonrotatable body and the rotatable body. An actuator is configured to engage and disengage the lock effector. A controller is configured to: determine whether shift conditions are met, where the shift conditions comprise requirements for initiating a shift between the number of sprockets; unlock the lock by disengaging the lock effector through the actuator when the shift conditions are met; and lock the lock by engaging the lock effector through the actuator when the shift is complete.

In various embodiments, a method of operating a derailleur of a cycle includes linking a cassette that includes a number of sprockets with a drive unit configured to drive the cassette. A chain is guided around the cassette the by the derailleur. Tension on the chain is maintained by a swing arm of the derailleur. A controller unlocks a lock disposed at a pivot assembly of the derailleur to control the tension on the chain during a gear shift. The controller unlocks the lock when the gear shift is complete.

In additional embodiments, when the lock is locked the cassette drives the drive unit through the chain generating power to charge a battery.

In additional embodiments, before unlocking the lock the controller determines whether shift conditions are met, where the shift conditions comprise requirements for initiating a shift between the number of sprockets.

In additional embodiments, when the lock is unlocked the derailleur shifts the chain between the number of sprockets. A pedal torque model is processed to match timing of the gear shift to a shift window where torque on the chain is below a threshold.

In additional embodiments, a shift synchronization model is processed to match timing of the gear shift to an ideal shift point where the chain is positioned at a select point relative to the cassette.

In additional embodiments a processor determines whether shift conditions are met prior to unlocking the lock, where the shift conditions comprise requirements for initiating the gear shift.

In additional embodiments, determining whether the shift conditions are met includes: determining whether a brake signal is active; determining whether a wheel speed of the cycle is below a first threshold where the wheel speed is too low to initiate a gear shift; and determining whether torque is above a second threshold where the torque is too high to initiate the gear shift.

In additional embodiments, determining whether the shift conditions are met includes determining whether regenerative braking is active. Motor torque is reduced when the regenerative braking is active.

In additional embodiments, the gear shift is delayed when the drive unit is generating torque above a threshold.

In additional embodiments, the gear shift is delayed when the cassette is positioned ahead of a shift point, where the shift point is a position on the cassette that facilitates shifting.

In various other embodiments, a derailleur system includes a cassette that has a number of sprockets. A drive unit is configured to drive the cassette. A chain links the drive unit with the cassette. A derailleur is configured to guide the chain around the cassette and includes a swing arm rotatable at a pivot assembly to maintain tension on the chain. A lock is configured to selectively lock the swing arm from rotating. The cycle includes a frame and the derailleur is coupled with the frame. The lock includes a lock effector disposed between the frame and the swing arm. An actuator engages and disengages the lock effector. A controller is configured to: determine whether shift conditions are met, where the shift conditions comprise requirements for initiating a shift between the number of sprockets; unlock the lock by disengaging the lock effector through the actuator when the shift conditions are met; and lock the lock by engaging the lock effector through the actuator when the shift is complete.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application or its uses. Furthermore, there is no intention to be bound by any expressed or implied theory presented in the preceding technical field, introduction, brief summary or the following detailed description. As used herein, the term module refers to any hardware, software, firmware, electronic control component, processing logic, and/or processor device, individually or in any combination, including without limitation: an application specific integrated circuit, an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As disclosed herein, improvements are provided that enable regenerative braking in e-bikes and in managing pedal torque and driveline synchronization for smoother shifts and extended durability in any type of cycle. A derailleur generally includes a lock to enable back-driving from the rear wheel to the propulsion system for regenerative battery charging. Control of the derailleur's shifting is timed to coincide with unlocking of the derailleur, with low torque widows related to pedal positions, and with ideal shift points of the rear cassette.

Figure 1:
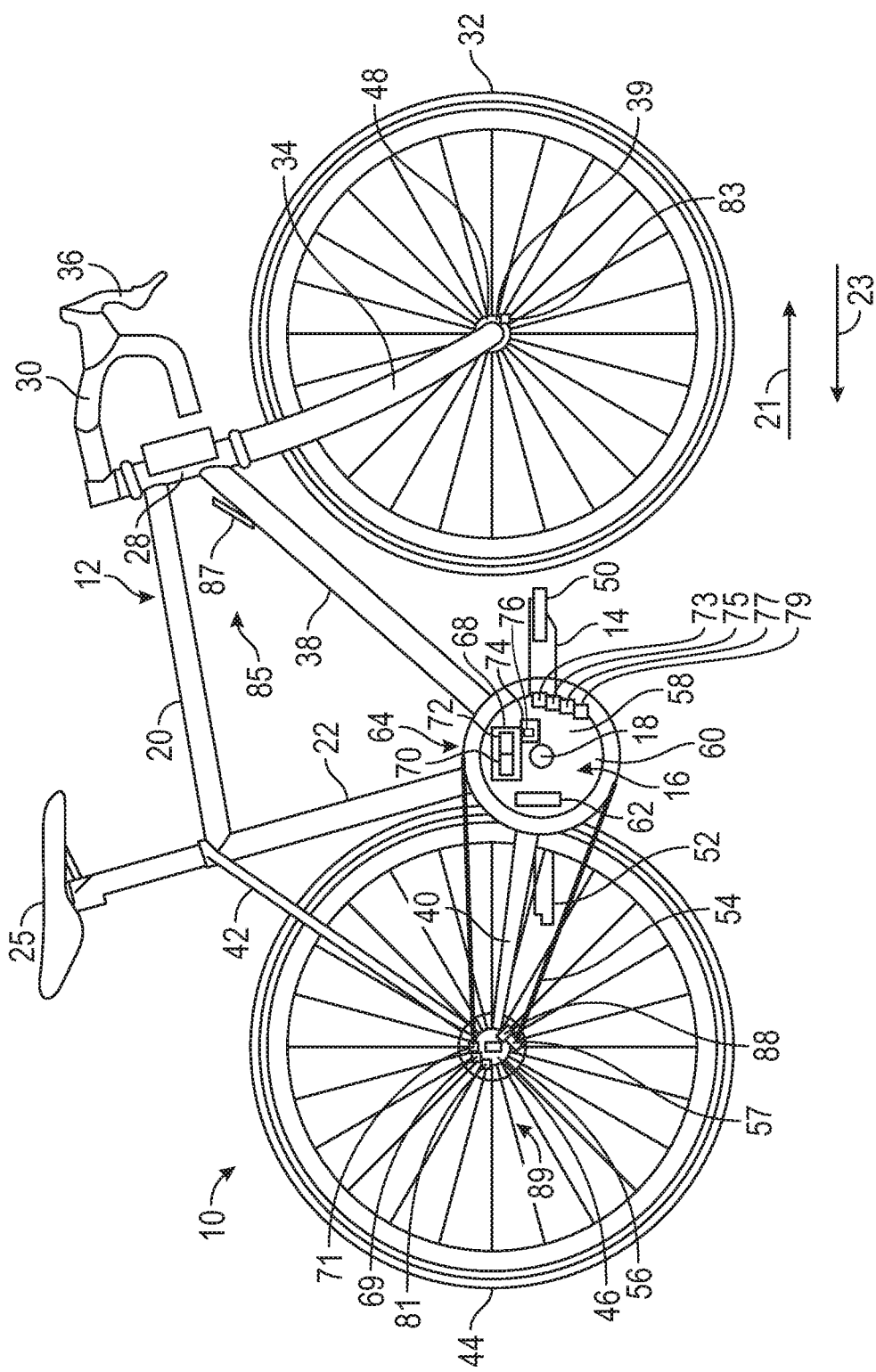
FIG. 1 illustrates a cycle with a derailleur system, in accordance with various embodiments.

FIG. 1 illustrates a cycle 10 according to an exemplary embodiment. In various embodiments, the cycle 10 may be a manually powered cycle, a manually powered cycle with power assist, or an engine/motor powered cycle of various wheel configurations. The cycle 10 is configured to normally operate in a forward direction 21. A reverse direction 23 is directed opposite the forward direction 21. The cycle 10 is configured with an active derailleur 57, increasing the level of control over chain slack and enabling additional functionality as detailed below. For example, in a number of embodiments, the cycle 10 is also configured with regenerative braking and/or reverse drive operation.

In general, the cycle 10 includes a frame 12 which may include a top tube 20 connected to a seat tube 22. A seat assembly 25 is connected with the seat tube 22. A steering tube 28 may extend from the top tube 20. A down tube 38 may extend between the seat tube 22 and the steering tube 28. The steering tube 28 is operatively connected to a front fork 34 which is attached to a front wheel 32 via a front axle assembly 48. Handlebars 30 are attached to the front fork 34 and are used to control the direction of the front wheel 32. The handlebars 30 and the front fork 34 are connected to the frame 12 at the steering tube 28. Control levers 36 may be provided on the handlebars 30 or at other locations and are constructed and arranged to communicate with one or more controlled devices such as brakes 39. A chain stay 40 and a seat stay 42 extend rearward from the seat tube 22 and support a rear wheel 44 on a rear axle 46.

The cycle 10 includes a propulsion system 16. In a number of embodiments, the propulsion system 16 includes a crank assembly 14 which includes a crankshaft 18 that may be connected with a pair of pedal assemblies 50, 52. A chain 54 is operatively connected between the propulsion system 16 and a cassette 56 of the rear wheel 44. The chain 54 is routed through the derailleur 57, which effects gear changes between various sprockets of the cassette 56 at the rear wheel 44 in response to control inputs. The derailleur 57 includes a pivot assembly 88 as further described below. In a number of embodiments, the propulsion system 16 includes a drive unit 58 powered by an electric machine 60 that draws power from a battery pack 62 and that may operate as a motor/generator. The drive unit 58 may provide propulsion assistance to the crank assembly 14. In some embodiments, the drive unit 58 may be the sole power source for propelling the cycle 10.

In the embodiment of FIG. 1, the cycle 10 includes a controller 68. In general, the controller 68 accepts information from various sources, process that information, and provide control commands based thereon to effect outcomes such as operation of the vehicle propulsion system 16 and other systems, including an active derailleur control system 64. In the depicted embodiment, the controller 68 includes a processor 70, a memory device 72, and is coupled with a storage device 74. The controller 68 may receive signals from a sensor system 67 of the cycle 10. The sensor system 67 includes one or more sensing devices that sense observable conditions of the cycle 10. In this embodiment, the sensing devices include, but are not limited to, a cassette position sensor 69 that senses the rotational angle of the cassette 56, a gear position sensor 71 that senses on which sprocket of the cassette 56 that the chain 54 is engaged, a pedal position sensor 73 that senses the angular position of the pedals 50, 52, a pedal torque sensor 75 that senses the torque applied by the pedals 50, 52, a drive torque sensor 77 that senses the overall torque on the driveline 89, a rotational speed sensor 79 that senses pedaling cadence, a speed sensor 81 that senses angular speed of the wheel 44 and a brake sensor 83 that senses actuation of the brakes 39. The controller 68 may also receive shift commands from a shift system 85 including from an operator interface 87, which may be a manually actuated device such as a lever. In some embodiments, shift commands may originate at the processor 70. The processor 70 performs the computation and control functions of the controller 68, and may comprise any type of processor or multiple processors, single integrated circuits such as a microprocessor, or any suitable number of integrated circuit devices and/or circuit boards working in cooperation to accomplish the functions of a processing unit. During operation, the processor 70 executes one or more programs 76 that may be loaded in the storage device 74 and, as such, controls the general operation of the controller 68, generally in executing a lock and shift control system 90, and the processes described herein, such as the processes 300 and 400 further described below in connection with FIGS. 8 and 9.

The memory device 72 may be any type of suitable memory. For example, the memory device 72 may include volatile and nonvolatile storage in read-only memory (ROM), random-access memory (RAM), and keep-alive memory (KAM), for example. KAM is a persistent or non-volatile memory that may be used to store various operating variables while the processor 70 is powered down. The memory device 72 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 68. In certain examples, the memory device 72 is located on and/or co-located on the same computer chip as the processor 70.

In the depicted embodiment, the storage device 74 stores the above-referenced programs 76 along with other information. For example, the storage device 74 stores data for use in automatically controlling systems of the cycle 10. The storage device 74 may be any suitable type of storage apparatus, including direct access storage devices such as hard disk drives, flash systems, floppy disk drives and optical disk drives. In one exemplary embodiment, the storage device 74 comprises a source from which the memory device 72 receives the programs 76 that execute one or more embodiments of one or more processes of the present disclosure, such as the steps of the processes 300, 400 (and any sub-processes thereof) described further below in connection with FIGS. 8 and 9. In another exemplary embodiment, the programs 76 may be directly stored in and/or otherwise accessed by the memory device 72. The programs 76 represent executable instructions, used by the electronic controller 68 in processing information and in controlling the cycle 10, including the active derailleur control system 64. The instructions may include one or more separate programs, each of which comprises an ordered listing of executable instructions for implementing logical functions. The instructions, when executed by the processor 70 support the receipt and processing of signals such as from the sensor system 67, perform logic, calculations, methods and/or algorithms for automatically controlling the components and systems of the cycle 10. The processor 70 may generate control signals such as for the drive unit 58 and/or the derailleur 57 based on the logic, calculations, methods, and/or algorithms.

Figure 3:
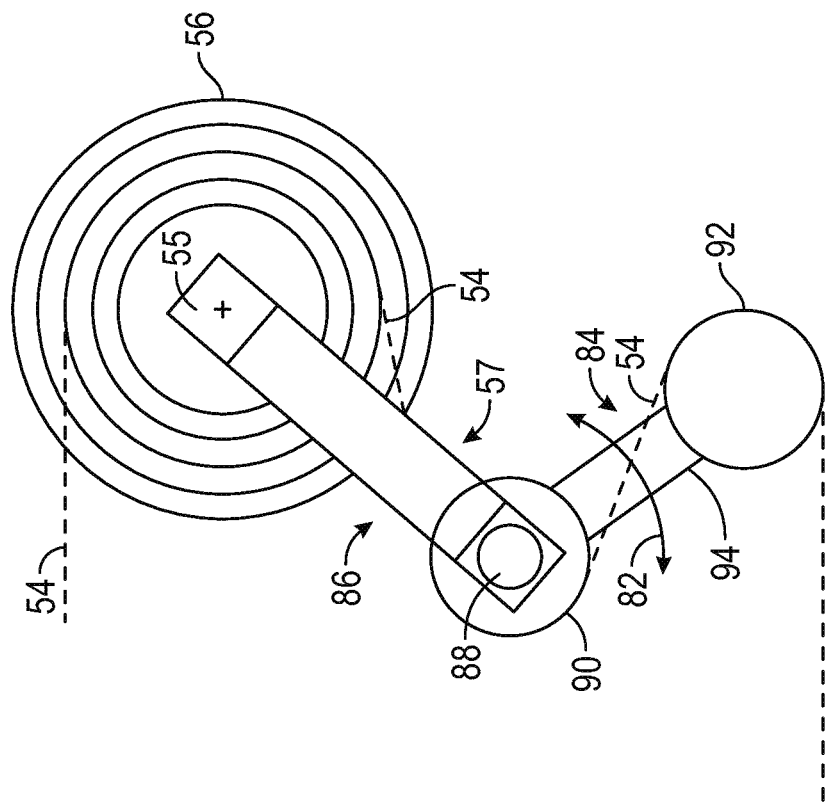
FIG. 3 is a schematic illustration taken from a side perspective of part of a derailleur system, in accordance with various embodiments.
Figure 2:
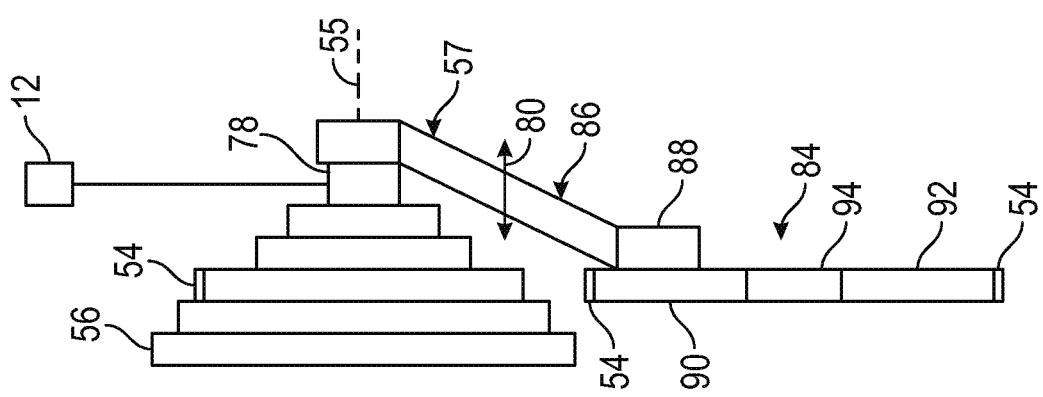
FIG. 2 is a schematic illustration taken from a forward perspective of part of a derailleur system, in accordance with various embodiments.

In FIGS. 2 and 3, mechanical aspects of the derailleur 57 are shown schematically. The cassette 56 is disposed to rotate with the rear wheel 44 and engages the chain 54. In general, the derailleur 57 includes parts that move in a direction parallel to the axis of rotation 55 of the rear wheel 44 in a gear change motion 80. The derailleur 57 also includes parts that move in a rotational direction 82 to take up slack and apply tension to the chain 54 and make adjustments as the chain 54 moves between sprockets of the cassette 56. More specifically, the derailleur 57 includes a shift linkage 86 that connects to the frame 12 at a plate 78 thereof, and suspends jockey wheels in a wheel assembly 84 for movement parallel to the rear axle 46 in the gear change motion 80 to shift between sprockets of the cassette 56. When moved in the gear change motion 80, the shift linkage 86 urges the chain 54 to move up and down the cassette 56 while remaining parallel to the individual sprockets. The wheel assembly 84 includes a guide pulley 90, an idler pulley 92 and a swing arm 94 that effects tension on the chain 54. A spring (not shown) may be engaged with the swing arm 94 to apply the tension. The guide pulley 90 keeps the chain 54 in line as it moves between sprockets during shifts. The idler pulley 92 tensions the chain 54 through the various gear selections. The swing arm 94 maintains the chain in line between the pulleys 90, 92. The swing arm 94, and the wheel assembly 84 in general, rotates about the shift linkage 86 at a pivot assembly 88.

Figure 4:
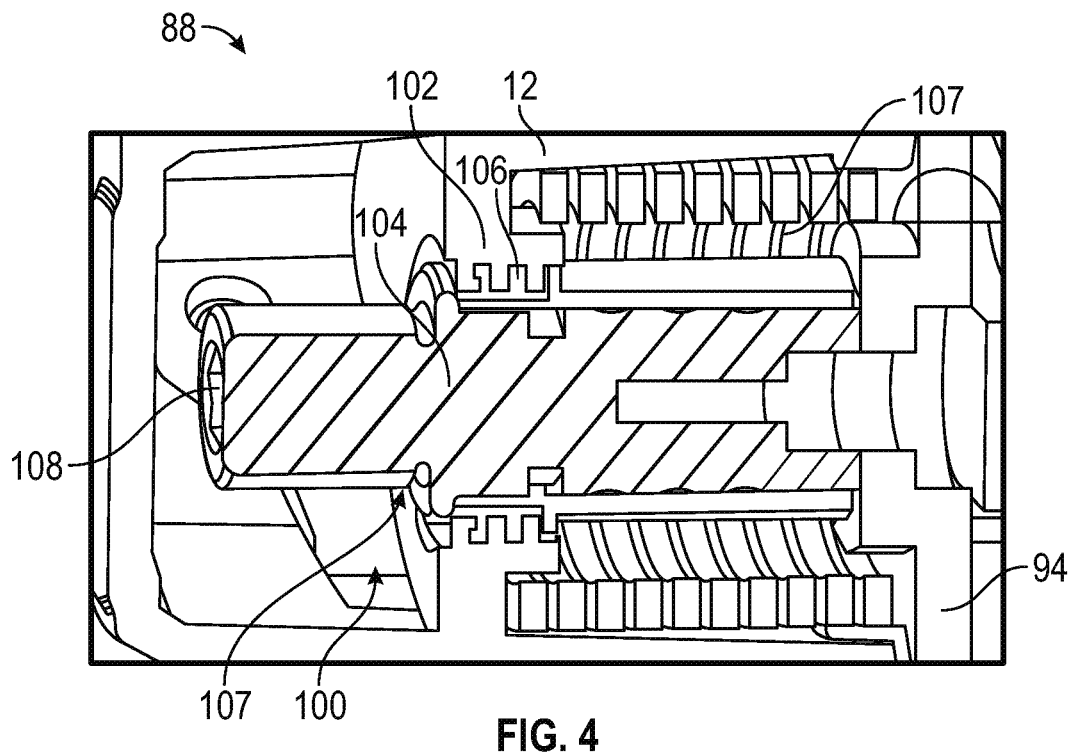
FIG. 4 is a fragmentary cross sectional illustration of a clutch type lock system of the derailleur system of FIG. 1, in accordance with various embodiments.
Figure 5:
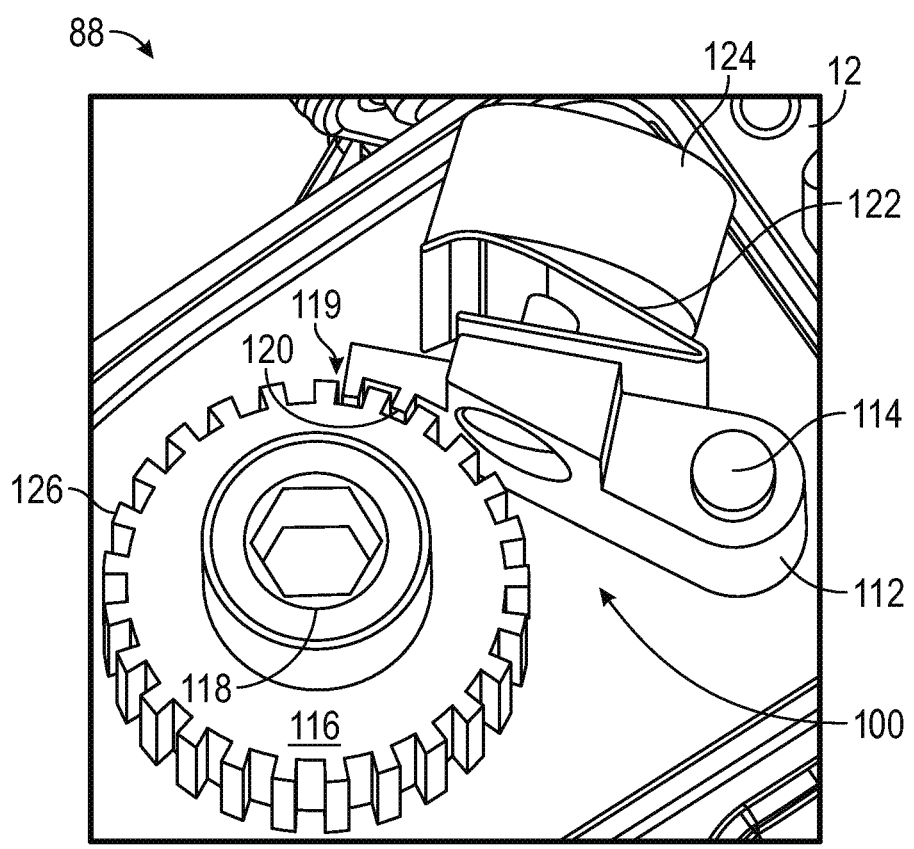
FIG. 5 is a fragmentary illustration of a radial-type lock system of the derailleur system of FIG. 1 with its cover removed, in accordance with various embodiments.

Embodiments of the pivot assembly 88 are shown in FIGS. 3-5, to which reference is directed. The pivot assembly 88 generally includes a lock 100, which is a mechanism to prevent the swing arm 94 from swinging in the rotational direction 82, and which may be configured in a variety of embodiments. Locking the swing arm 94 means that the swing arm 94/wheel assembly 84 cannot make tension adjustments and therefore does not support gear changes between different sized sprocket of the cassette 56. However, because tension remains constant, the rear wheel 44 may be used to drive the cassette 56 and therethrough to drive the chain 54, harnessing kinetic energy for delivery to the propulsion system 16. For example, the chain 54 may be used to provide regenerative braking where the propulsion system 16 slows the bicycle 10 and generates electricity via the electric machine 60 to charge the battery pack 62. In addition, operation of the cycle 10 in the reverse direction 23 is enabled driving through the derailleur 57. In a number of embodiments, the cassette 56 does not include a freewheel feature, or may include an override of the freewheel such as a clutch (not shown) to enable the rear wheel 44 to drive the propulsion system 16.

In the embodiment of FIG. 4, the lock 100 includes a nonrotatable body 102 that is configured as an annular element fixed to the frame 12, and includes a rotatable body 104 fixed to the swing arm 94 and configured as a cylinder disposed inside the nonrotatable body 102. A tension spring 107 is disposed to rotationally bias the rotatable body 104 applying tension on the chain 54, and a clutch 106 is disposed as a lock effector 107 to alternatively lock and unlock the swing arm 94 relative to the nonrotatable body 102. The clutch 106 may be actuated in a number of ways and in the current embodiment includes an electric actuator 108. When the actuator 108 is deenergized, the clutch 106 is closed and the rotatable body 104 is locked from rotating relative to the nonrotatable body 102 and the frame 12. When the actuator 108 is energized, the clutch 106 is open and the rotatable body 104 is unlocked from the nonrotatable body 102 to freely rotate subject to the bias of the tension spring 107.

As shown in FIG. 5, another embodiment of the lock 100 includes a nonrotatable body 112 configured as a lever and disposed on a pivot 114. While the nonrotatable body 112 pivots it does not rotate with the swing arm 94 but is fixed to the frame 12 through the pivot 114. The lock 100 also includes a rotatable body 116 configured as a toothed wheel fixed to rotate with the swing arm 94 through a bolt 118. The nonrotatable body 112 includes teeth 120 that mesh with teeth 126 of the rotatable body 116 as a lock effector 119 to lock the swing arm 94 against rotating. A spring 122 biases the teeth 120, 126 into engagement so that the rotatable body 116 is normally locked from rotating. An actuator 124 is coupled with the nonrotatable body 112 and when energized, pivots the nonrotatable body 112 to compress the spring 122 and release the teeth 120 from the teeth 126 of the rotatable body 116. The rotatable body 116 is then free to rotate.

Figure 6:
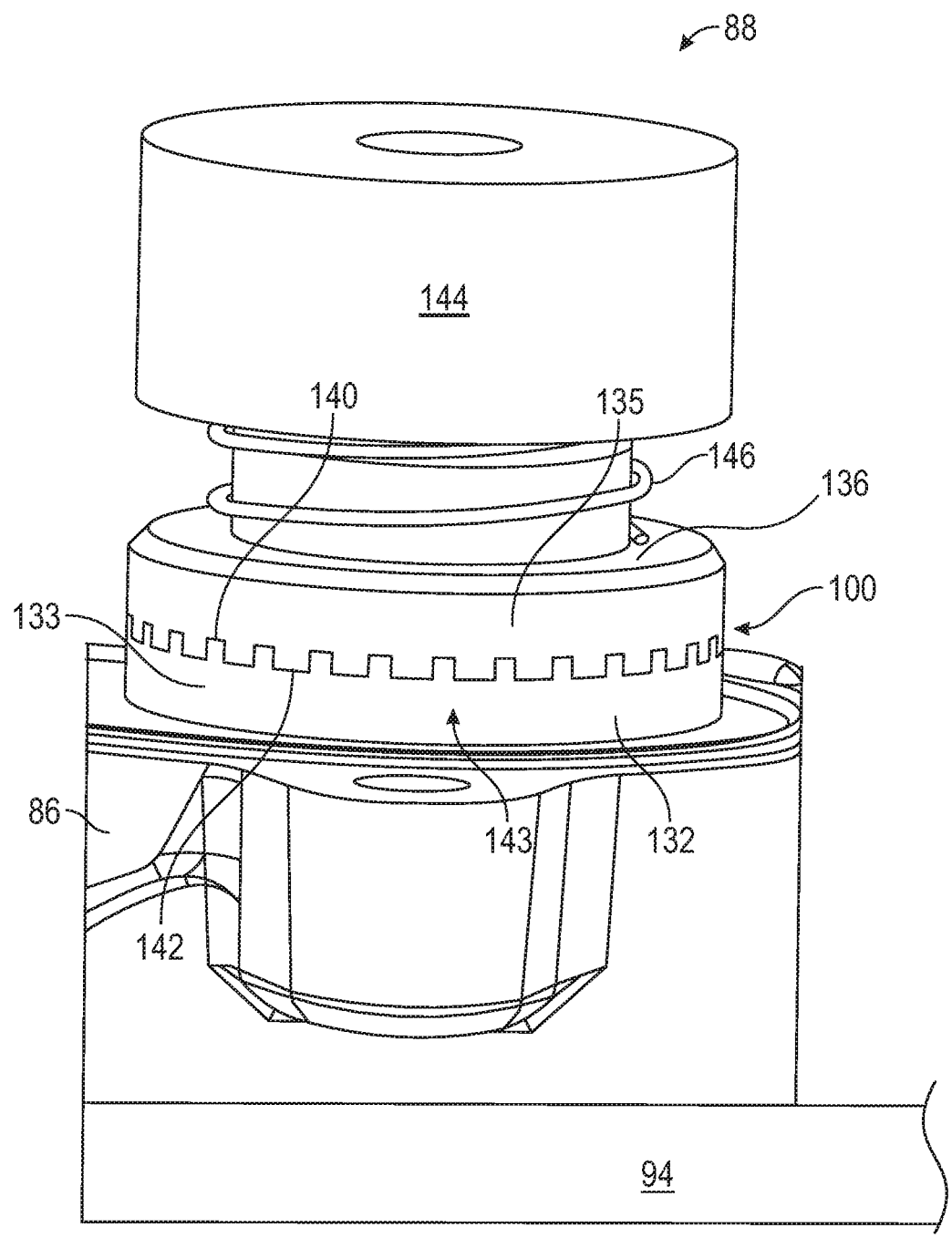
FIG. 6 is a fragmentary illustration of an axial-type lock system of the derailleur system of FIG. 1, in accordance with various embodiments.

FIG. 6 illustrates another embodiment of the lock 100 that includes a nonrotatable body 132 configured as an annular toothed wall 133. The wall 133 is disposed on the shift linkage 86, which is fixed to the frame 12 (FIG. 3). As a result, the nonrotatable body 132 does not rotate with the swing arm 94 but is fixed to the frame 12. The lock 100 also includes a rotatable body 136 configured with a toothed wheel 135 fixed to rotate with the swing arm 94. The nonrotatable body 132 includes teeth 140 that mesh with the teeth 142 of the rotatable body 136 as the lock effector 143 that locks the swing arm 94 against rotating. A spring 146 biases the teeth 142 into engagement with the teeth 140 so that the rotatable body 136 is normally locked from rotating. An actuator 144, such as a solenoid, is coupled with the rotatable body 136 and when energized, pulls the rotatable body 136 to compress the spring 122 and release the teeth 142 from the teeth 140. The rotatable body 136 is then free to rotate, as is the swing arm 94.

Accordingly, the lock 100 includes a lock effector 107, 119, 143 that in each case alternately locks and unlocks the swing arm 94 for nonrotation or rotation. An actuator 108, 124, 144 is controllable to unlock the lock effector 107, 119, 143 allowing the swing arm 94 to move in the rotational direction 82, and is controllable to lock the lock effector 107, 119, 143 to prevent the swing arm 94 from moving in the rotational direction 82. When unlocked, gear changes may be made and the derailleur 57 makes adjustments for movement of the chain 54 between sprockets of the cassette 56 while maintain tension. When locked, gear changes are inhibited, but regenerative braking, reverse operation, and chain slack prevention are enabled.

Figure 7:
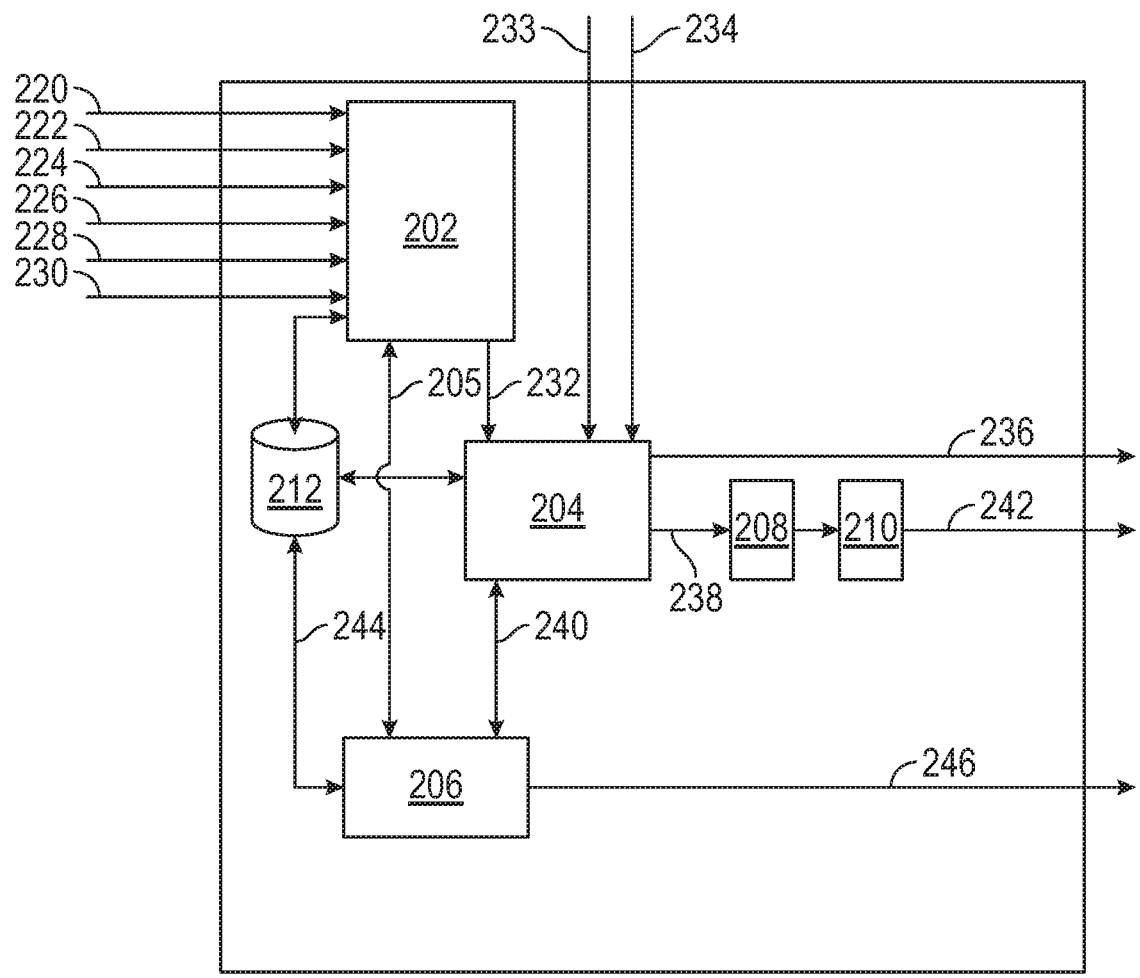
FIG. 7 is a dataflow diagram illustrating an active derailleur control system, in accordance with various embodiments.

Referring to FIG. 7, a dataflow diagram illustrates various embodiments of the active derailleur control system 64 at least part of which may be embedded within the controller 68 and carried out by the processor 70. In general, the active derailleur control system 64, receives inputs from the sensor system 67 and the storage device 74, and via the processor 70, controls aspects of the cycle 10 including the shift system 85 and the derailleur 57. For example, the active derailleur control system 64 controls when gear shifting is enabled and controls unlocking the derailleur 57. In general, the active derailleur control system 64 includes a shift conditions module 202, a derailleur lock and shift control module 204, an error management module 206, a driveline synchronization module 208, a pedal position module 210 and a datastore 212, which may contain data from the storage device 74.

The shift conditions module 202 processes a shift conditions algorithm (described below), which may be accessed from the datastore 212 to determine whether shifting will be enabled. The shift conditions module 202 receives a gear shift request signal 220, such as from the shift system 85, a pedal torque signal 222, such as from the pedal torque sensor 75, a motor torque signal 224, such as may be derived from the driveline torque sensor 77 and the pedal torque sensor 75 or from the propulsion system 16, a brake signal 226, such as from the brake sensor 83, a wheel speed signal 228, such as from the rotational speed sensor 79 and a regen active signal 230, such as from the propulsion system 16. The shift conditions module 202 processes the signals through the shift conditions algorithm and determines whether conditions are amenable for gear shifting. When shift conditions are met, the shift conditions module 202 signals 232, the derailleur lock and shift control module 204. If an error arises in the determination, an error message 205 may be delivered to the error management module 206.

The derailleur lock and shift control module 204 processes a derailleur lock and shift control algorithm (described below), which may be accessed from the datastore 212 to determine whether unlocking of the lock 100 of the derailleur 57 may proceed and whether to initiate gear shifts by operation of the derailleur 57. The derailleur lock and shift control module 204 receives a derailleur lock status signal 234, such as from the lock 100, a gear status signal 233, such as from the gear position sensor 71, and the shift conditions met signal 232 from the shift conditions module 202. The derailleur lock and shift control module 204 may unlock the lock 100 via unlock signal 236 and may deliver a gear shift confirmed signal 238. The gear shift confirmed signal 238 may, in some embodiments, be processed through the driveline synchronization module 208 to synch the gear shift with the position of the cassette 56 and the pedal position module to time the gear shift with position of the pedals 50, 52 to avoid high torque shifting. In other embodiments, the gear shift confirmed signal 238 may be used to initiate shifting.

The driveline synchronization module 208 accesses a driveline synchronization model (described below), such as from the datastore 212, which is used for determining shift timing. The pedal position module 210 accesses a pedal torque model (described below), such as from the datastore 212, which is also used for determining shift timing. After any timing modifications from the driveline synchronization module 208 and the pedal position module 210, a shift gears signal 242 is delivered to the derailleur 57. If an error arises in unlocking the lock 100 or in shifting gears, an error message 240 may be delivered to the error management module 206 for use as described below. Error messages 244 are sent to the datastore 212 for storage and retrieval. In the event that either the shift condition module 202 or the derailleur lock and shift control module identifies an error that requires servicing, a service signal 246 is delivered.

Figure 8A:
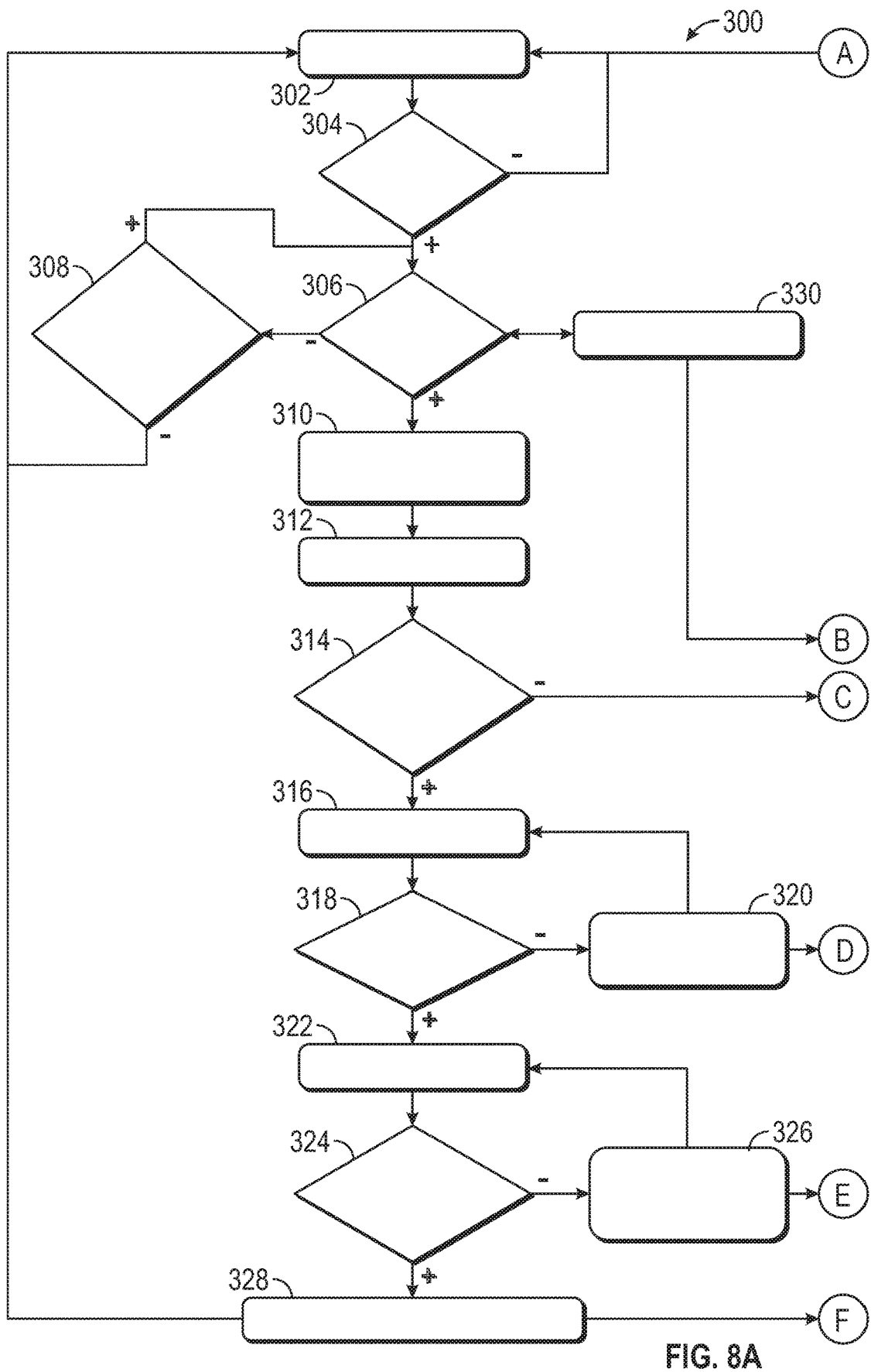
FIGS. 8A and 8B are a flowchart of methods for controlling the active derailleur system, in accordance with various embodiments.
Figure 8B:
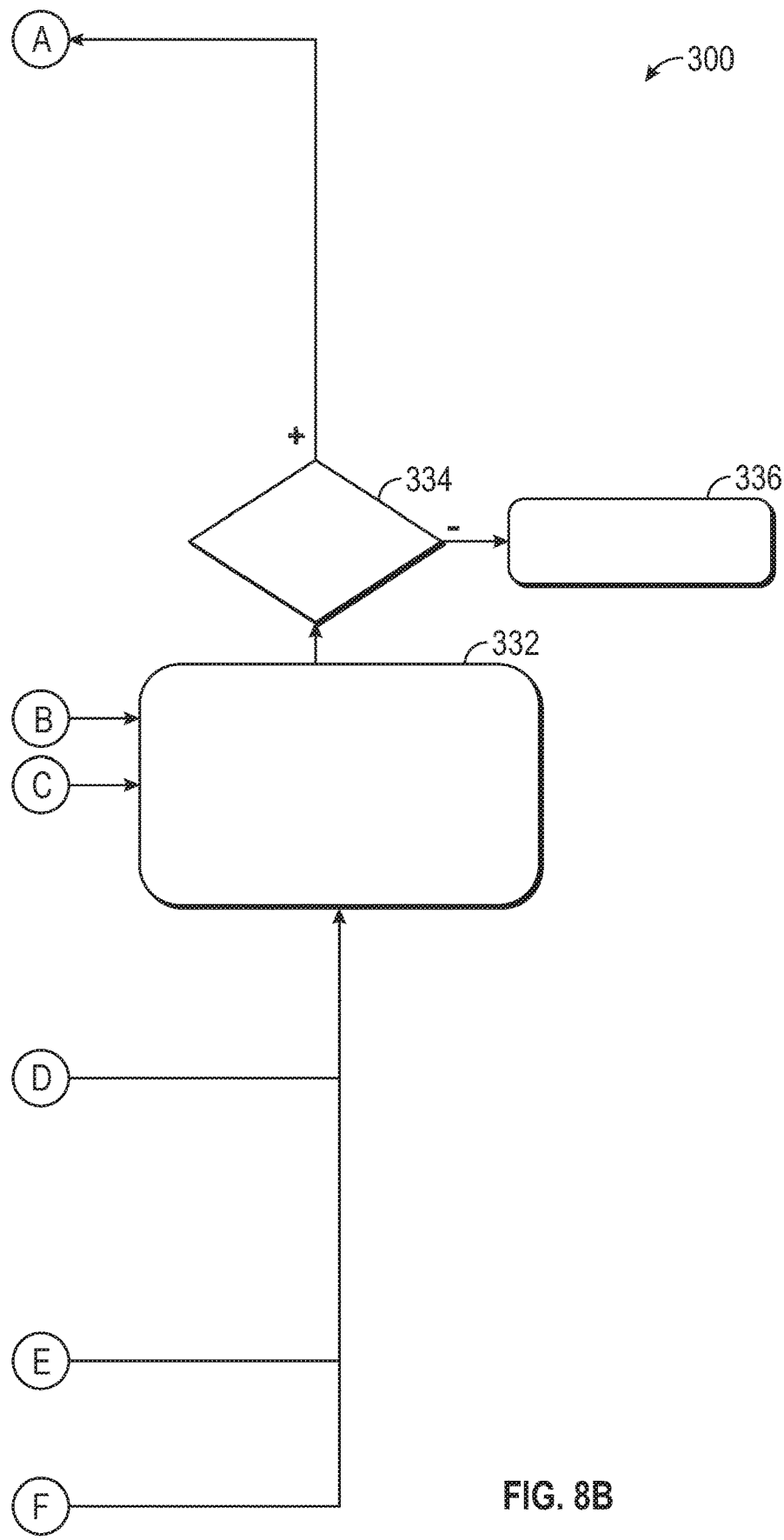

A process 300 for controlling the derailleur 57 is illustrated in FIGS. 8A-8B in flowchart form. The process 300 initiates 302 and a determination 304 is made, such as by the processor 70, as to whether the gear shift signal 220 is received. When the determination 304 is negative the process 300 returns to initiate 302. When the determination 304 is positive, the process 300 proceeds to determine 306 whether shift conditions are met, such as through the shift conditions module 202. Shift conditions may evaluate factors such as torque speed and brake status as further described below and generally comprise requirements for initiating a shift between the number of sprockets on the cassette 56. When the determination 306 is negative and shift conditions are not met, the process 300 proceeds to determine 308 whether load conditions change during a short time window such as a fraction of a second. For example, load conditions may initially be too high for shifting when a rider is applying high torque via the pedals 50, 52, so instant shifting is not preferred. However, the rider may select a gear change via the operator interface 87 and the rider may subsequently ease up on pedaling, lowering driveline torque sufficient to pass the shift conditions met determination 306. When such conditions occur, there is a reevaluation at determination step 306 of whether shift conditions are met. Specifically, when the determination 308 is positive, the process 300 loops back and the determination 306 is again conducted.

When the determination 306 results in a positive outcome and shift conditions are met, the process 300 proceeds to initiate 310 operation of the derailleur 57, such as by the shift conditions met signal 232. The derailleur 57 is unlocked 312, such as via the unlock signal 236. For example, the lock 100 is operated by the derailleur lock and shift control module 204, unlocking the pivot assembly 88 to enable the swing arm 94 to swing in the rotational direction 82 to adjust the chain 54 to a different sized sprocket of the cassette 56. A determination 314 is made as to whether the derailleur 57 has been successfully unlocked. For example, a position sensor (not shown) in the pivot assembly 88 may indicate that the lock 100 has moved to the unlocked position.

When the determination 314 is positive, the process 300 proceeds to shift gears 316 through operation of the derailleur 57, such as in response to issuance of the shift gears signal 242. The shift gears signal 242 may be issued directly by the derailleur lock and shift control module 204, or a gear shift confirmed signal 238 may issue and be subject to further processing as described below prior to issuance of the shift gears signal 242. It will be appreciated that in a number of embodiments, the derailleur 57 may have an electric actuator (not shown), responsive to the controller 68 to move the shift linkage 86. In other embodiments, the movement of the shift linkage 86 may be inhibited by an electro-mechanical stop (not shown), that is responsive to the controller 68 and that is moved to allow shifting. In additional embodiments, the derailleur 57 may be actuated mechanically and may include a mechanism (not shown) to hold actuation pending the shift gears signal 242. The process 300 proceeds to determine 318 whether the gear shift has been successful. For example, the gear position sensor 71 may be used to indicate the current gear. When the determination is negative, the process 300 proceeds to shift back 320 to the starting gear and again attempts to shift gears 316.

When the determination 318 is positive and the gears are successfully shifted, the process 300 proceeds to lock 322 the derailleur 57. For example, the lock 100 is returned to its normal locked condition such as by suspending power to the actuator 108, 124, 144. A determination 324 is made as to whether the derailleur 57 was locked successfully. When the determination 324 is negative, the process 300 proceeds to disable 326 regenerative braking. For example, the error management module 206 may deliver the disable signal 246 to the propulsion system 16. The process retries to lock 322 the derailleur 57. When the determination 324 is positive, the process 300 completes 328 the gear shifting routine and the derailleur 57 is locked, such as for enabling a reverse flow of energy from the rear wheel 44 to the propulsion system 16 for regenerative braking. When gear shifting is complete 328, the status is reported for recording 332.

The process 300 also includes error handling, for example through the error management module 206. When the shift conditions met determination 306 identifies an input signal error, a report 330 is sent to be recorded 332 such as in the datastore 212. In addition, when the derailleur unlocked successfully determination 314 is negative, when the gears shifted successfully determination is negative, or when the derailleur locked successfully determination 324 is negative, an error is reported to be recorded 332. Error messages, such as by the error management module 206, may be classified by severity, may be used for diagnostics, may be used to send message to the rider, and may be used to disable functions. Generally, the process 300 retries to carry out a function after a failure is reported, which informs whether the error is the result of a simple glitch or if it is persistent such as due to a hardware issue. For example, derailleur unlock, gear shift and derailleur lock functions are all attempted a second time if the first attempt fails. The process 300 proceeds to determine 334 whether the involved hardware is capable of responding. For example, the hardware may be damaged, or may be overloaded or overheated such as due to a jam. If the hardware is not capable of responding to a successfully sent signal, an error message indicating needed service may be delivered for perception by the rider. When the determination 334 is positive, the process may continue to initiate 302. When the determination 334 is negative and the involved hardware is not capable of responding, the process 300 disables 336 gear shifting, such as by the disable signal 246, pending service. In addition, successful gear shifting reported from gear shifting complete 328 may be used to clear error messages such as service-required.

Figure 9A:
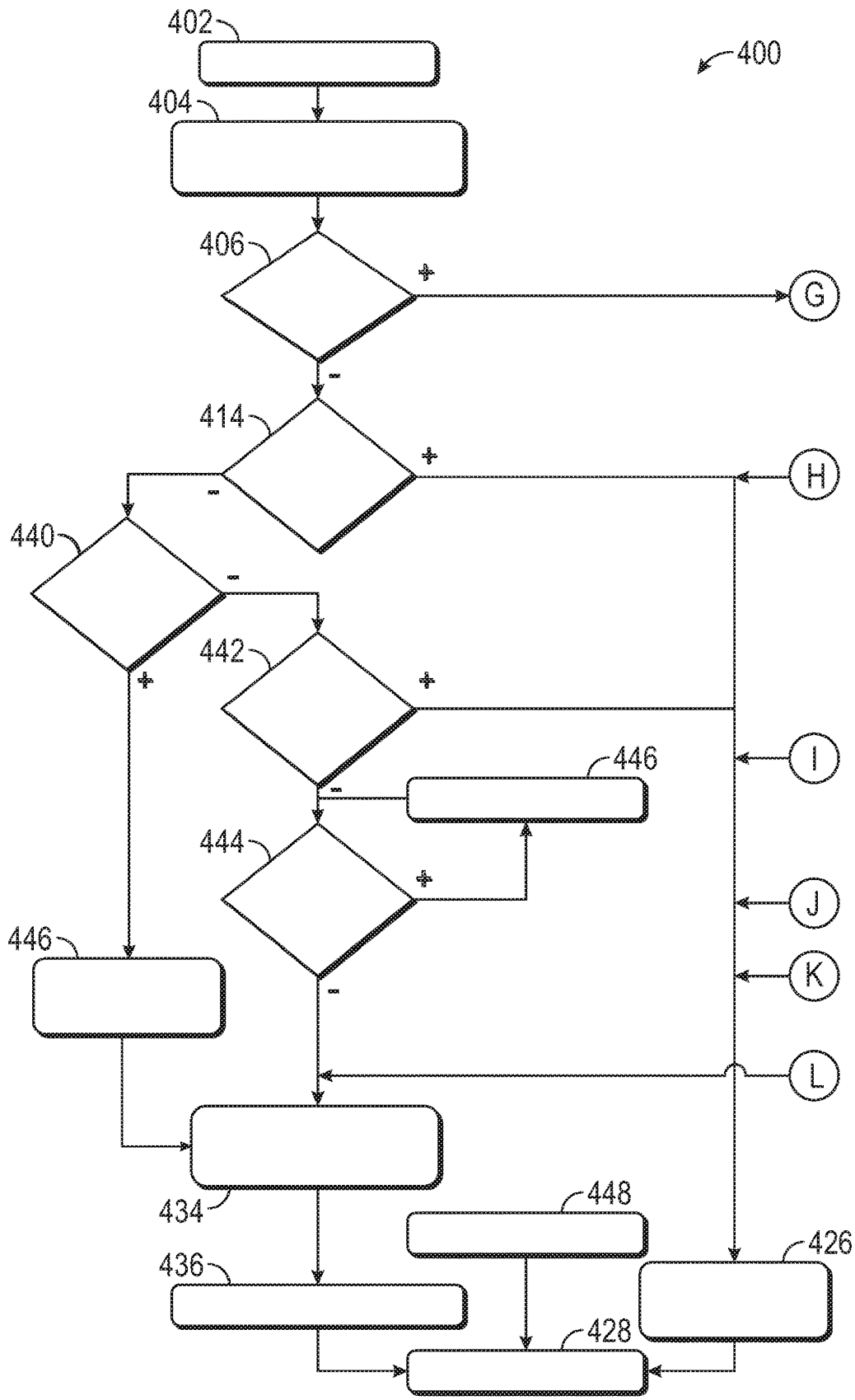
FIGS. 9A and 9B are a flowchart of methods for determining whether shift conditions are met in controlling the active derailleur system, in accordance with various embodiments.
Figure 9B:
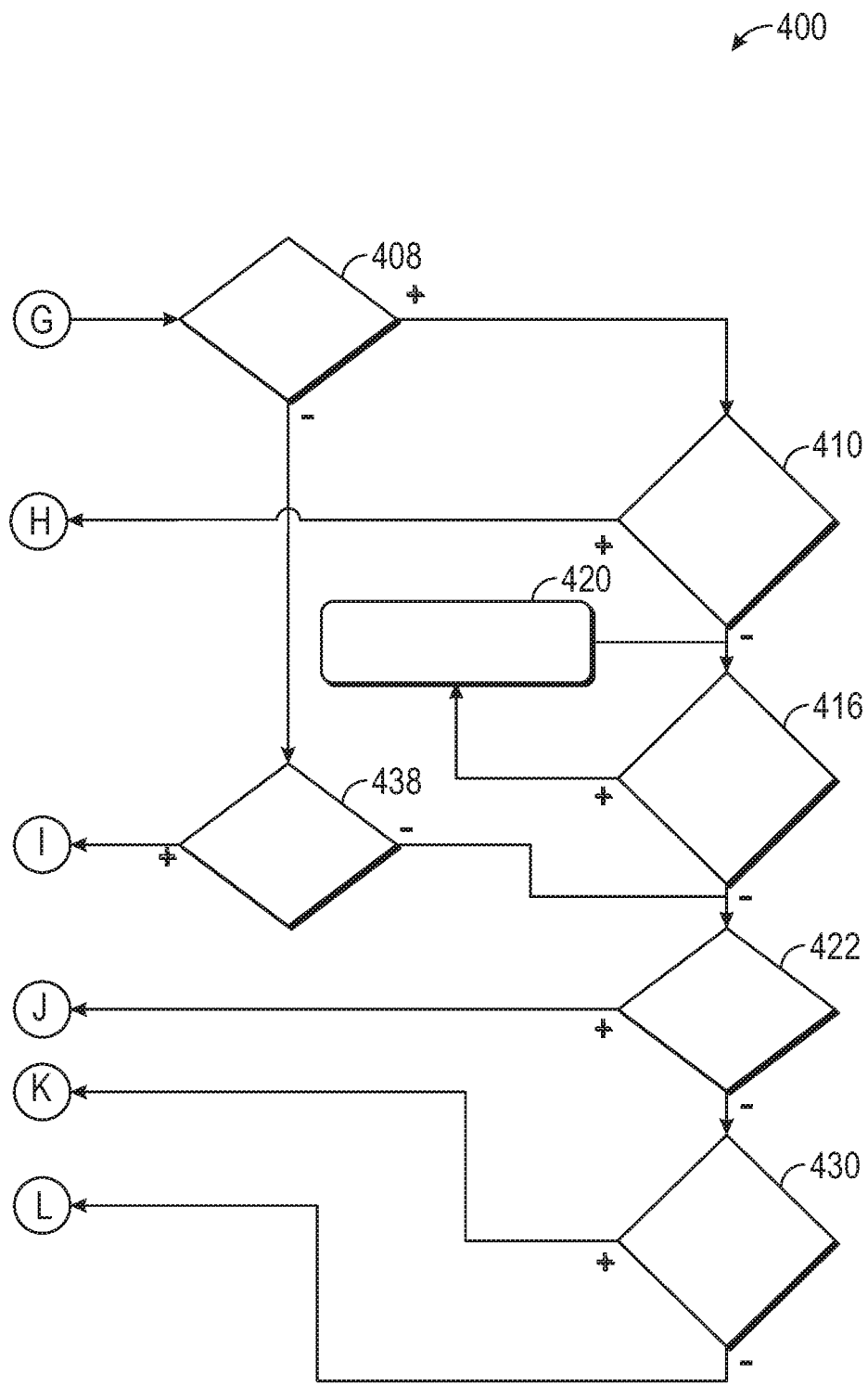

Details of a process 400 for the shift conditions met determination 306 are shown in FIGS. 9A-9B, to which reference is additionally directed. The process 400 begins 402 and resets 404 input signal errors and proceeds with the gear shift signal 304 from the process 300. A determination 406 is made as to whether a brake signal is present. For example, the brake signal 226 may be present from the brake sensor 83. When the determination 406 is positive, and a brake signal 226 is present, meaning braking is active, the process 400 proceeds to determine 408, whether regenerative braking is active. For example, the propulsion system 16 may be charging the battery pack 62 using input from the rear wheel 44 to drive the chain 54 and the electric machine 60 as a generator as indicated by the regenerative braking signal input 230.

When the determination 408 is positive, and regenerative braking is active, the process 400 proceeds to determine 410 whether pedal torque exceeds a threshold and is at too high of a level to shift. In making the determination 410, the process 400 may receive a pedal torque value, such as from the pedal torque sensor 75 via the pedal torque signal 222. When the determination 410 is positive, the process 400 proceeds to conclude that shift conditions are not met 426 and to end 428. When the determination 410 is negative, the process 400 proceeds to determine 416, whether motor torque is above a threshold and is at too high of a level for effecting a shift. For example, shifting at high torques may not be preferred due to rough shifting and mechanical wear/stress. In making the determination 416, the process 400 may use a motor torque value such as from the motor torque signal 224, or which may be derived from inputs from the drive torque sensor 77 and the pedal torque sensor 75. When the determination 416 is positive, the process 400 proceeds to reduce 420 motor torque and again processes the determination 416. When the determination 416 is negative, the process 400 proceeds to determine 422, whether wheel speed is below a threshold and is at too low of a level to shift, such as from the wheel speed input 228 from the wheel speed sensor 81. When the determination 422 is positive, the process 400 proceeds to conclude 426 that shift conditions are not met and ends 428. When the determination 422 is negative, the process 400 proceeds to determine 430 whether deceleration is above a threshold and is at too high of a level for shifting. In making the determination 430, the process 400 may receive an indication of a wheel deceleration value such as may be derived from the wheel speed sensor 81 inputs 228 or from other sources such as an acceleration sensor. When the determination 430 is positive, the process 400 proceeds to conclude 426 that shift conditions are not met and ends 428. When the determination 430 is negative, the process 400 proceeds to process 434 a driveline shift synchronization model. In some embodiments, processing 434 the driveline synchronization model may be optional and the process 400 may proceed directly to concluding 436 that shift conditions are met and ends 428.

Returning to the determination 408 of whether regenerative braking is active, when the determination 408 is negative, the process 400 proceeds to determine 438, whether pedal torque is at too high of a level, such as by using the received pedal torque input 222. When the determination 438 is negative the process 400 proceeds to the determination 422 and therefrom as described above. When the determination 438 is positive, the process 400 proceeds to conclude 426 that shift conditions are not met and ends 428.

Returning to the determination 414, as to whether wheel speed is at too low of a level, the result may be derived from the wheel speed signal 228. For example, zero and near-zero speeds may be too low to effect a shift. When the determination 414 is negative, the process 400 proceeds to determine 440 whether an optional pedal torque model will be processed. For example, the controller 68 may be programmed to process the pedal torque model in all or in select situations. In other embodiments, the pedal torque model may not be used and the process 400 may proceed directly to a determination 442 as to whether pedal torque is at too high of a level. The determination 442 may be processed, such as by using the pedal torque input 222. When the determination 442 is positive, the process 400 proceeds to conclude 426 that shift conditions are not met and ends 428. When the determination 442 is negative, the process 400 proceeds to determine 444, whether overall driveline torque is above a threshold and is at too high of a level such as by using the motor torque input 224 and the pedal torque input 222. When the determination 444 is negative, the process 400 proceeds to reduce 446 motor torque and reprocesses the determination 444. When the determination 444 is negative, the process 400 proceeds to process the driveline synchronization model 434, or alternatively, when the driveline synchronization model is not used, directly to determine 436 that the shift conditions are met and ends 428.

Returning to the determination 440, when the determination is positive and the pedal torque model is used, such as in the pedal position module 208, the pedal torque model is processed 446 as further described below. The process 400 proceeds to process the driveline synchronization model 434 also as further described below, or alternatively, when the driveline synchronization model is not used, proceeds directly to determine 436 that the shift conditions are met and ends 428. Any input signal errors that arise during the process 400 are stored 448, such as in the datastore 212, and may be used in the error management module 206.

Processing 446 the pedal torque model such as in the pedal position module 210 in general, involves evaluation of the pedaling cadence and may time a shift to occur within a low torque shift window where torque on the chain 54 is below a threshold selected to ensure smooth shifting and for durability of system components. Shifting may be delayed for a time delay, such as of a fraction of a second, allowing the pedals 50, 52 to move to an angle that coincides with the shift window. Shifting within the shift window is preferred because low torque conditions exist. When shifting within the shift windows, motor torque does not need to be reduced. As shown schematically in FIG. 10, the pedals 50, 52 rotate around the drive unit 58 during pedaling, and apply a relatively high torque during a downward force on each side via the pedals 50, 52. A pair of low torque windows 450, 452 occur when the pedals are approaching and leaving the 12 o'clock and 6 o'clock positions. When the pedals 50, 52 are positioned outside the low torque shift windows 450, 452, a shift delay 454 may be instituted to time the shift to occur during the shift windows 450, 452.

Processing 446 the pedal torque model involves receiving inputs for pedal position, such as from the pedal position sensor 73, pedal torque, such as from the pedal torque sensor 75, pedal cadence, such as from the rotational speed sensor 79, motor torque, such as may be derived from the pedal torque sensor 75 and the driveline torque sensor 77, shift torque limit, such as may be retrieved from the datastore 212, current gear, such as from the gear position sensor 71, shift input, such as from the shift system 85, and input signal error data, such as from the datastore 212.

Logic of the pedal torque model includes proceeding with shifting gears when the sum of pedal torque and motor torque is less than a threshold equal to the shift torque limit of the driveline 89. When the sum of the pedal and motor torques exceed the shift torque limit threshold of the driveline 89, prior to shifting a time to reach the shift windows 450, 452 is calculated. To determine the torque, the pedal torque used is the highest torque recorded by the pedal torque sensor during the previous pedal stroke. The highest motor torque value used is the highest torque recorded during the current session in which the cycle 10 is operating. To calculate the time to the shift window 450, 452, pedal cadence and location is used. The minimum value for the shift window angle 455 is the minimum angle required for chain engagement during shifting. The minimum angle 455 may take into consideration mechanism delays specific to the application. The current shift window angle 456 is the maximum angle for which the sum of pedal torque and motor torque is less than or equal to the shift torque limit. Calculating the shift windows 450, 452 includes defining plus and minus limits of the shift window angle 456 and its mirror shift window angle 458 at 180 degrees. When the current shift window angle 456, 458 is less than the minimum shift window angle 455 plus any added tolerance, motor torque is reduced so that the sum of motor torque and pedal torque is less than the shift torque limit. When the pedal position is within the shift window angle plus any added tolerance, shifting may proceed. When the pedal position is not within the shift window angle plus any added tolerance, the shift delay 454 is implemented and once the delay 454 expires, shifting proceeds. In some embodiments, a generic shift window may be stored, such as in the datastore 212 and retrieved for use rather than calculating the current shift window angle 456, 458. When signal errors exist, shift functionality may implement a "go home" gear for safe return or gear shifting may be carried out without torque considerations.

Figure 10:
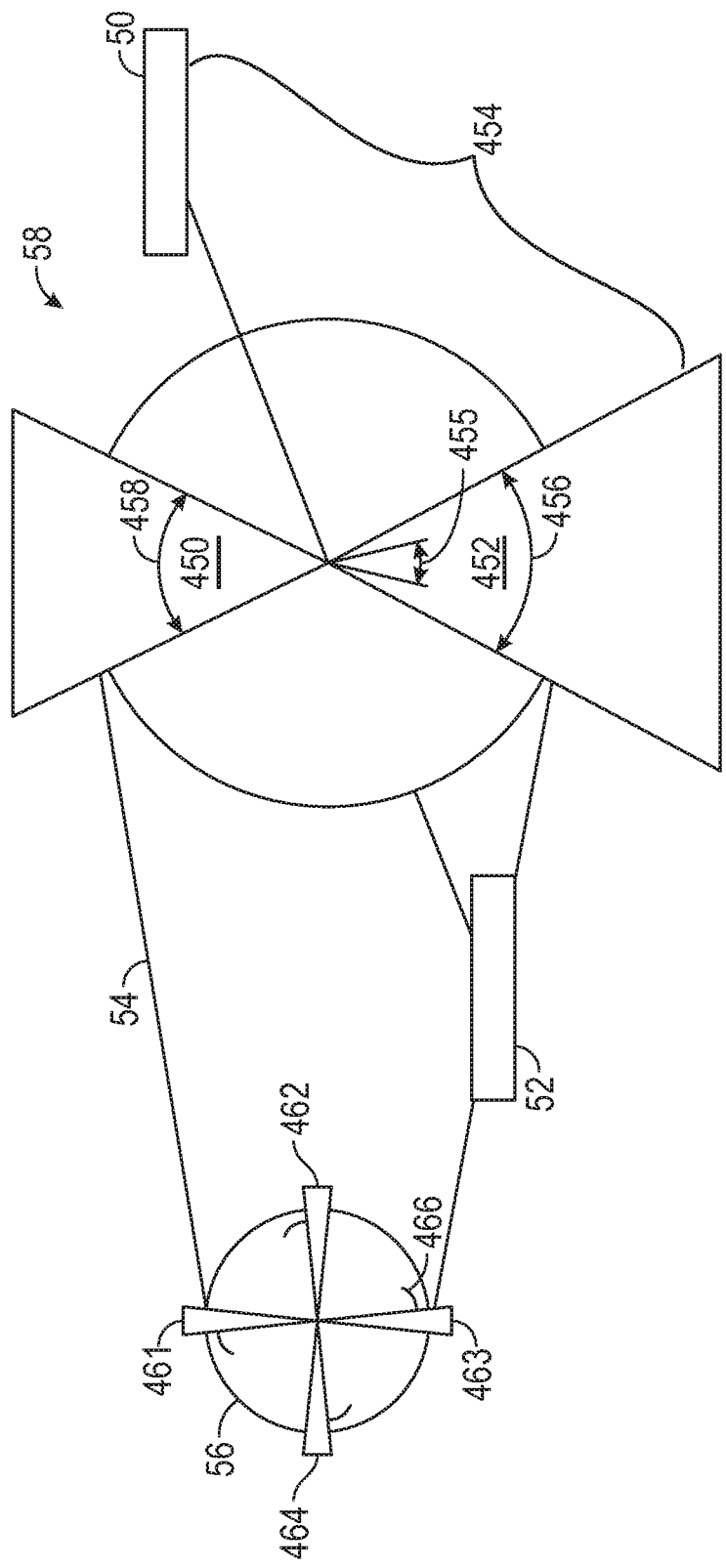
FIG. 10 is a schematic diagram of a driveline of the cycle of FIG. 1, in accordance with various embodiments.

Also shown in FIG. 10 are ideal shift points 461-464 of the cassette 56, which are certain positions where shifting between sprockets of the cassette 56 is easier due to shifting ramps 466 formed in the sprocket teeth of the cassette 56. The driveline shift synchronization model as processed by the driveline synchronization module 208, matches the shift point of the derailleur 57 to optimal rotational positions of the cassette 56 for smooth chain engagement with low input torque. The number and location of ideal shift points 461-464 is a function of individual gear design and the driveline's shifting model. Inputs for the driveline shift synchronization model include cassette position, such as from the cassette position angle sensor 69, current gear, such as from the gear position sensor 71, shift input, such as from the shift system 85, and input signal error data, such as from the datastore 212, and shift window data, such as may be retrieved from the datastore 212.

When a shift signal is present, the angle that must be traversed to reach the next ideal shift point is calculated, such as by the driveline synchronization module 208. The angle needed to reach the ideal shift point 461-464 is calculated. The angle until reaching the shift is equal to the ideal shift point location minus the cassette's position. The angle that must be traversed until reaching the shift may be translated from the cassette 56 to the crankshaft 18 using the physical relationship between the current sprocket of the cassette 56 and the current sprocket of the crank assembly 14. When the translated angle at the drive unit 58 is within the shift window 450, 452, then after any needed delay to the ideal shift point at the cassette 56, gear shifting proceeds. Motor torque may be reduced so that the sum of motor torque and pedal torque is less than or equal to the shift torque limit and shifting proceeds. When the calculated angle indicates a delay to reach the ideal shift point is needed, the angle that must be traversed to reach the shift point is determined, and is equal to the ideal shift point minus the cassette position. When the sum of motor torque plus pedal torque is less than or equal to the shift torque limit, a delay is implemented to traverse the angle to shift and the gear shift is initiated. Otherwise, motor torque is reduced so that the sum of motor torque plus pedal torque is less than or equal to the shift torque limit, and a delay is implemented to traverse the angle to shift and the gear shift is initiated. In some embodiments, driveline shift synchronization may be deactivated or skipped. In such embodiments, gear changes may be harsher and chain durability may be reduced.

Accordingly, derailleur design and operation enables regenerative braking with shift timing that considers pedal torque and driveline synchronization for smoother shifts and extended durability. The controls may be tailored to preference performance or durability in shift timing. Additional benefits include reducing chain slop and chain dropping during rough road riding, by maintain tension with the derailleur's lock. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A derailleur system for a cycle, the system comprising:
a cassette including a number of sprockets;
a drive unit configured to drive the cassette;
a chain linking the drive unit with the cassette;
a derailleur, configured to guide the chain around the cassette, the derailleur including:
a shift linkage configured to shift the chain between the number of sprockets of the cassette;
a swing arm extending from the shift linkage and rotatable at a pivot assembly on the shift linkage to maintain tension on the chain; and
a lock configured to selectively lock the swing arm from rotating,
wherein selectively lock means the swing arm is prevented from rotating and the shift linkage is prevented from shifting the chain between the number of sprockets.

2. The system of claim 1, wherein the cassette is configured to drive the drive unit through the chain when the lock is selectively locked in a locked position, with the drive unit configured, with an electric machine, to generate electric power.

3. The system of claim 1, comprising:
a frame of the cycle, wherein the derailleur is coupled with the frame,
wherein the pivot assembly comprises a nonrotatable body fixed to the frame, and a rotatable body fixed to the swing arm,
wherein the lock comprises a lock effector disposed between the nonrotatable body and the rotatable body, the lock effector configured to positively lock the swing arm to the frame through the rotatable body and the nonrotatable body.

4. The system of claim 3, wherein the lock effector comprises a clutch, the nonrotatable body comprises an annular element fixed from rotation, and the rotatable body is fixed to the swing arm and comprises a cylinder disposed inside the nonrotatable body, and comprising an actuator configured to close the clutch with the rotatable body locked from rotating relative to the nonrotatable body and to open the clutch with the rotatable body unlocked from the nonrotatable body.

5. The system of claim 3, wherein the lock effector comprises first teeth on the nonrotatable body selectively engageable with second teeth on the rotatable body.

6. The system of claim 1 comprising a controller configured to:
determine whether shift conditions are met, where the shift conditions comprise requirements for initiating a shift between the number of sprockets;
unlock the lock when the shift conditions are met; and
lock the lock when the shift is complete, wherein the requirements for initiating the shift include:
determine whether a brake signal is present;
determine whether regenerative braking is active;
determine whether pedal torque exceeds a first threshold;
determine whether motor torque is above a second threshold; and
determine whether wheel speed of the cycle is above a third threshold.

7. The system of claim 1, comprising a controller configured to:
unlock the lock to effect a shift between the number of sprockets;
lock the lock when the shift is complete; and
process a pedal torque model to match timing of the shift to a shift window where torque on the chain is below a threshold, including evaluating a pedaling cadence of the cycle to time the shift to occur within a low torque shift window where torque on the chain is below a threshold and where pedals of the cycle are disposed at an angle that coincides with the shift window.

8. The system of claim 1, comprising a controller configured to:
unlock the lock to effect a shift between the number of sprockets;
lock the lock when the shift is complete; and
process a model to match timing of the shift to an ideal shift point where the chain is positioned at a select point relative to the cassette, wherein the select point coincides with shifting ramps formed in sprocket teeth of the cassette.

9. The system of claim 1, comprising:
a frame of the cycle, wherein the derailleur is coupled with the frame, wherein the pivot assembly comprises a nonrotatable body fixed to the frame, and a rotatable body fixed to the swing arm, wherein the lock comprises a lock effector disposed between the nonrotatable body and the rotatable body;
an actuator configured to engage and disengage the lock effector; and
a controller configured to:
determine whether shift conditions are met, where the shift conditions comprise requirements for initiating a shift between the number of sprockets;
unlock the lock by disengaging the lock effector through the actuator when the shift conditions are met; and
lock the lock by engaging the lock effector through the actuator when the shift is complete.

10. A method of operating a derailleur of a cycle, the method comprising:
linking, by a chain, a cassette that includes a number of sprockets with a drive unit configured to drive the cassette;
guiding the chain around the cassette by the derailleur;
shifting, by a shift linkage of the derailleur, the chain between the number of sprockets of the cassette by moving the shift linkage in a gear change motion;
maintaining a tension on the chain by a swing arm of the derailleur, the swing arm rotatable at a pivot assembly, wherein the shift arm extends from the shift linkage and is selectively rotatable relative to the shift linkage about the pivot assembly;
unlocking, by a controller, a lock at the pivot assembly of the derailleur to control the tension on the chain during a gear shift, the lock configured to selectively lock the swing arm from rotating; and
locking, by the controller, the lock when the gear shift is complete, wherein locking means the swing arm is prevented from rotating and the shift linkage is prevented from shifting the chain between the number of sprockets.

11. The method of claim 10, comprising:
driving, by the cassette and when the lock is locked, the drive unit through the chain; and
generating power to charge a battery by the driving of the drive unit.

12. The method of claim 10, comprising:
determining, by the controller and before unlocking the lock, whether shift conditions are met, where the shift conditions comprise requirements for initiating a shift between the number of sprockets.

13. The method of claim 10, comprising:
shifting, by the derailleur and when the lock is unlocked, the chain between the number of sprockets; and
processing a pedal torque model to match timing of the gear shift to a shift window where torque on the chain is below a threshold.

14. The method of claim 10, comprising:
processing a shift synchronization model to match timing of the gear shift to an ideal shift point where the chain is positioned at a select point relative to the cassette.

15. The method of claim 10, comprising:
determining whether shift conditions are met prior to unlocking the lock, where the shift conditions comprise requirements for initiating the gear shift, including determining, from a speed sensor, whether speed of the cycle is above a threshold for making a shift.

16. The method of claim 15, wherein the determining whether the shift conditions are met comprises:
determining whether a brake signal is active;
determining whether a wheel speed of the cycle is below a first threshold where the wheel speed is too low to initiate a gear shift; and
determining whether torque is above a second threshold where the torque is too high to initiate the gear shift.

17. The method of claim 15, wherein the determining whether the shift conditions are met comprises determining whether regenerative braking is active; and comprising reducing motor torque when the regenerative braking is active.

18. The method of claim 11, comprising delaying the gear shift when the drive unit is generating torque above a threshold.

19. The method of claim 11, comprising delaying the gear shift when the cassette is positioned ahead of a shift point, where the shift point is a position on the cassette that facilitates shifting.

20. A cycle with a derailleur system at a rear wheel of the cycle, the cycle comprising:
   a cassette including a number of sprockets, the cassette disposed at the rear wheel;
   a drive unit powered by an electric machine and configured to drive the cassette;
   a chain linking the drive unit with the cassette;
   a derailleur, configured to guide the chain around the cassette, the derailleur including a shift linkage configured to shift the chain between the number of sprockets of the cassette and a swing arm rotatable at a pivot assembly on the shift linkage to maintain tension on the chain;
   a lock configured to selectively lock the swing arm from rotating;
   a frame of the cycle, wherein the derailleur is coupled with the frame, wherein the lock comprises a lock effector disposed between the frame and the swing arm;
   an actuator configured to engage and disengage the lock effector; and
   a controller configured to:
   determine whether shift conditions are met, where the shift conditions comprise requirements for initiating a shift between the number of sprockets including whether a brake signal is present; whether regenerative braking is active; whether pedal torque exceeds a first threshold; whether motor torque is above a second threshold; and whether a wheel speed of the cycle is above a third threshold;
   unlock the lock, by disengaging the lock effector through the actuator when the shift conditions are met; and
   lock the lock, by engaging the lock effector through the actuator when the shift is complete,
   wherein lock means the swing arm is prevented from rotating relative to the shift linkage so that the rear wheel is configured to drive the drive unit and the electric machine through the chain without creating slack in the chain.

* * * * *